United States Patent [19]  [11] 3,983,285
Riboulet et al.  [45]*Sept. 28, 1976

[54] COMPOSITE POLYESTER FILMS AND PROCESS FOR PRODUCING THE SAME

[75] Inventors: Robert Riboulet, Crepieux; Eugene Charvet, Saint Maurice de Beynost, both of France

[73] Assignee: La Cellophane, Paris, France

[ * ] Notice: The portion of the term of this patent subsequent to Aug. 19, 1992, has been disclaimed.

[22] Filed: June 4, 1974

[21] Appl. No.: 476,284

Related U.S. Application Data

[63] Continuation-in-part of Ser. No. 332,183, Feb. 3, 1973, Pat. No. 3,900,653.

[30] Foreign Application Priority Data

Feb. 16, 1972 France ............................ 72.05115
June 8, 1973 France ............................ 73.20883

[52] U.S. Cl. .............................. 428/212; 264/172; 428/409; 428/480; 428/900; 428/910
[51] Int. Cl.² .................. B32B 33/00; B32B 27/18; B32B 27/36
[58] Field of Search ............ 161/164, 166, 225, 214, 161/231, 1, 2, 408–411; 264/171, 172; 428/409, 212, 480, 910, 913

[56] References Cited
UNITED STATES PATENTS

3,022,192  2/1962  Brandt ............................ 428/910 X
3,515,626  6/1970  Duffield ............................ 161/162
3,574,048  4/1971  Klimisch ............................ 161/190
3,645,822  2/1972  Widiger et al. ...................... 156/243
3,790,653  2/1974  Barkey et al. ...................... 264/171
3,823,947  7/1974  Sasaki et al. ................... 161/164 X

*Primary Examiner*—Harold Ansher
*Attorney, Agent, or Firm*—Sherman & Shalloway

[57] ABSTRACT

A monoaxially or biaxially drawn composite polyester film comprising at least two layers of polyesters having different physical properties. At least one polyester layer is produced utilizing a catalytic system wherein the catalyst residue is insoluble in the polymer and at least one other polyester layer is produced using a catalyst system wherein the catalytic residue is soluble or only slightly insoluble in the polyester. A process for producing such composite polyester film comprises coextruding at least two polyester polymers into a layered film, one of these polyester layers containing crystallization sites in the form of the residue of the interchange catalyst used to form the polyester, and at least one polyester layer comprising a polyester wherein the interchange catalyst system is soluble or only slightly insoluble in the polyester; and drawing the layered film either monoaxially or biaxially.

These films have particular utility as support for magnetic recording tapes wherein one face of the film to be coated is smooth and the opposite face (undersurface) of the film has surface roughness.

10 Claims, 2 Drawing Figures

COMPOSITE POLYESTER FILMS AND PROCESS FOR PRODUCING THE SAME

CROSS-REFERENCE TO RELATED APPLICATION

This application is a continuation-in-part of U.S. Pat. application Ser. No. 332,183, filed Feb. 3, 1973 now U.S. Pat. No. 3,900,653.

BACKGROUND OF THE INVENTION

1. Field of the Invention

This invention relates to improved drawn polyester films and processes for making the same. More particularly, this invention relates to monoaxially and biaxially drawn polyester films which are sufficiently transparent and have sufficient slip properties so that these films may be utilized and processed properly on high speed processing machines. This invention also specifically relates to improved drawn polyester films which can be used as support for magnetic recording tapes.

2. Description of the Prior Art

Polyester films and especially polyethylene terephthalate films are utilized for a great number of purposes since these films have excellent physical properties. Often, however, the physical properties which are desired for a particular application result in other properties of the polyester film which are sometimes contradictory to the property most desired. For example, the transparency and slipperiness of polyester films are all interrelated with surface roughness and, while it is often desirable to produce polyester films with good slip properties so that the polyester films have the desired processibility, these films also have an opacity caused by the same surface roughness which produces the excellent slip properties. Accordingly, these films are unacceptable for a number of uses wherein both high transparency and good slip properties are desired.

Most polyester film for various end uses is now prepared as a single layer polyester film with various coatings added thereto so as to modify the surface properties of the polyester film, such as in U.S. Pat. Nos. 3,595,736, 3,627,625, 3,645,822 and 3,632,666. The co-extrusion of a series of polyesters wherein at least one of the co-extruded layers has a polyester modifying additive contained therein has been suggested for U.S. Pat. No. 3,515,626. The process as disclosed in this patent, however, has not been completely successful in removing all of the problems regarding the contradictory properties of polyester film. In this regard, although incorporating a specific amount of crystallinity-promoting material; i.e., crystallizing sites, into the polyester before extrusion promotes the crystallinity of the polyester in one layer, while not promoting the crystallinity of the polyester in the other layers on drawing, the incorporation of a proper amount of these crystallization sites into the polyester is a very delicate operation requiring absolute precision so that the desired properties are produced. Furthermore, the utilization of these additives because they are added in addition to the catalysts and other materials during the polycondensation of the polyesters, occasionally hinders the polycondensation reaction itself and thereby degrades the physical characteristics of the polyester films produced thereby. This is especially true with regard to color and thermal stability of the polyester films.

Although it is desirable to produce polyester films which have excellent surface slip so that they can be wound at high speeds and processed properly without interference caused by static buildup, previously this surface slip could only be obtained with a concomitant reduction in transparency. Transparent polyester film is especially desirable when the end product, monoaxially or biaxially drawn polyester film, is to be utilized in the graphic arts or as a textile material. Furthermore, the reduction in surface smoothness is also necessary when the polyester film is to be utilized as a metallized film base for use in gold tooling or in the manufacture of magnetic tapes.

Although polyester films can be produced having acceptable slip and transparency properties when these films are oriented either monoaxially or biaxially, the slip properties are improved by the drawing, while the transparency is decreased. This is caused by an increase in the surface roughness of the film produced by the orientation.

Often, however, for many uses it is not necessary that the surface characteristics of the polyester film be identical on both sides of the film and the finished product may sometimes even be improved when the polyester film has asymmetrical surface characteristics; i.e., a film having different surface characteristics on each of its two surfaces.

One such product where different surface characteristics are desired is polyester film used as support for magnetic recording tapes.

Magnetic tapes are made, at present, of polyester film that is drawn monoaxially or preferably biaxially, sometimes even longitudinally superdrawn.

Magnetic tape supports have to provide excellent mechanical properties. Good tear strength, perfect elasticity that eliminates any risk of irreversible deformation in the zone of mechanical stresses, a modulus appropriate to winding and unwinding operations are also required of films for magnetic tape supports. They must also be dimensionally very stable, with respect to climatic variations as well as to mechanical stresses. Moreover, they must have good planar qualities, as well as uniform thickness. They must be devoid of local defects. All of these qualities are fairly consistently attained in the present state of the art. See, for example, U.S. Pat. Nos. 3,293,066, 3,397,072, 3,501,344, 3,554,798, 3,555,557 and 3,734,772 relating to magnetic recording tapes.

However, magnetic tape supports must additionally provide a satisfactory glaze; i.e., smoothness, on the surface intended to be coated with a magnetic composition; e.g., $CrO_2$, $Fe_2O_3$, etc. and the undersurface of the film, on the other hand, must have a coefficient of friction such as will readily ensure winding and unwinding. Additionally, the support must have good resistance to abrasion. Abrasion results from the tape rubbing on the rollers and other elements of the apparatus, and also results from rubbing of the two faces of the tape against each other during winding, etc.

According to known techniques, these surface properties are very difficult to harmonize and, therefore, respecting the requirements of satisfactory glaze and coefficient of friction, the prior art techniques could not provide completely satisfactory products.

These requirements are essential nevertheless, particularly for many new applications of magnetic recording tapes requiring very high winding/unwinding speeds and other stringent requirments.

When magnetic recording tapes are wound rapidly, it is required that the pack of tape be as flat as possible;

i.e., individual layers of tape should not protrude appreciably from the rest of the pack. The main cause of unevenness is that, as the tape is wound, air is trapped between the layers of the tape, with the result that the tape floats on a cushion of air. The faster the tape is wound, the more air is trapped. In industry as well as in the studio, fast winding speeds are absolutely essential.

One prior art technique for providing a smooth surface/rough surface film for magnetic recording tapes was simply to roughen the undersurface of the film. This is usually effected by applying a coating in a thickness of about $5\mu$, the coating being filled with pigments and/or dyes. By carefully adjusting the relative proportions of pigment and binder, it is possible to achieve a surface roughness of from 0.5 to $10\mu$ in the dried coating. The statistically distributed irregularities in this layer penetrate the cushion of air and lead to early contact between the tape and the pack, with the result that floating of the tape on a cushion of air as it is wound is substantially avoided and the air can escape at the sides. However, the pronounced irregularities in the surface of this layer produce deformations in the magnetic tape during storage and these result in loss of contact between the magnetic layer and the recording or reproducing head when the tape is used.

U.S. Pat. No. 3,734,772, in an attempt to overcome some of these deficiencies, provides a pattern of raised dots having a high coefficient of friction on the undersurface of the film, but has not proven entirely satisfactory.

Though magnetic tapes intended for the recording of rather low frequency acoustic signals do not need a very fine glaze because the magnetic coatings that can accommodate themselves to these frequencies may be relatively thick and may be deposited without difficulty on rough supports whose undersurface presents an adequate coefficient of friction with easy winding, the situation is not the same where tapes for digital or analog recordings are concerned, such as those used at computer outputs. These must combine a fine glaze on the coated surface — the coating being sufficiently thin for recording signals of a frequency that may reach 300 kiloHz — with sufficient surface roughness for correct winding and unwinding.

Such tapes must be devoid of points of a certain height that could cause drop-out in recording or entail disturbance because of weakening of the signal. A compromise between such a surface state on the coated surface and the roughness of the undersurface that is sufficient to allow good film winding properties is extremely difficult to achieve. This is even more true because these tapes have to have good abrasion resistance which is essential to avoid formation of dust that could hamper reading of the tape. It is often necessary in practice to achieve an approximately satisfactory compromise result by coating the undersurface of the film support with a graphite or carbon base lubricant, but this is an obvious source of complication and difficulty, because of the need for good adherence of this coating and because of the risk of supplementary abrasion.

In the case of magnetic tape supports intended for analog signal recording for optical transmission; e.g., video recording, where signals with frequencies up to 5 to 7 megaHz have to be used for standard, and up to 20 megaHz for professional video recording, which requires extremely fine coatings, a compromise between the glaze of the coated face and the slip of the undersurface is not practical. In this case, it has previously been necessary that the undersurface receive a lubricant coating which cannot be devoid of a certain fragility.

It is within the above environment and background that the process and product of the present invention were developed.

SUMMARY OF THE INVENTION

The present invention allows an alleviation of these difficulties in general and, in particular, offers the possibility of obtaining magnetic tape supports that present the requisite mechanical qualities and an excellent resistance to abrasion by presenting one face whose glaze is devoid of roughness that would be deleterious to the intended application, and with the undersurface presenting a sufficiently low coefficient of friction to ensure good machinability.

Briefly, the composite polyester film of the present invention comprises a laminate having at least two layers, one of these layers comprising a polyester film which has been produced by a polycondensation reaction in the presence of a catalytic system which is insoluble in the polyester, and at least one layer comprising a polyester formed by a polycondensation reaction in the presence of a catalyst system which is soluble or only slightly insoluble in the polyester. The process of the present invention comprises co-extruding a polyester film having at least two layers, each of these layers formed from a separate polyester, at least one of these polyesters being formed by the polycondensation in the presence of a catalyst system which is insoluble in the polyester and at least one layer being formed by the polycondensation in the presence of a catalyst which is soluble or only slightly insoluble in the polyester, and drawing the films either monoaxially or biaxially.

The magnetic tape supports are formed from composite monoaxially or biaxially drawn films of polyester resins. These films can be produced by co-extrusion by two polyester polymers which at least have different qualities and are capable of leading to the formation after drawing of films that present different slip qualities, characterized in that the smoother face has a total roughness less than 0.5 microns and preferably less than 0.4 microns (as measured by the hereinafter discussed method), and the coefficient of friction of the undersurface; i.e., the face opposite the smooth face, is below 0.7 microns (as measured by the hereinafter discussed method).

DESCRIPTION OF THE PREFERRED EMBODIMENTS

Figure 1:
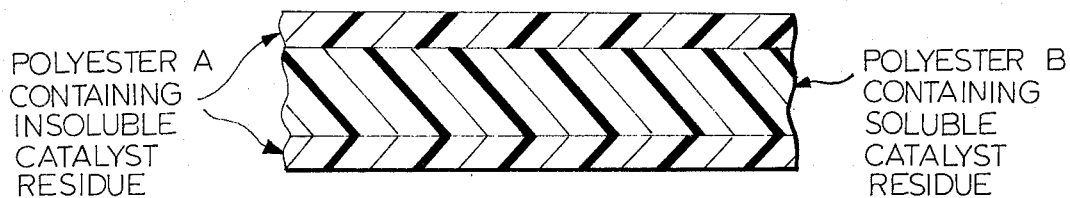
FIG. 1 is a cross-sectional view of one embodiment of the present invention.

The composite polyester laminate of the present invention comprises at least one polyester film layer formed from a polyester containing a catalyst residue which is insoluble in the polyester and at least one layer formed from a polyester containing a catalyst residue which is soluble or only slightly insoluble; i.e., substantially soluble, in the polyester.

In this manner, it is now possible to provide a composite polyester laminate where the layer formed with insoluble catalytic residue will provide sufficient slip, while the layer formed with soluble catalytic residue will provide sufficient glaze and transparency for the intended end use.

The superior properties of the product and process of the present invention reside in the discovery by applicants that the slip properties of the films vary as a function of the distribution in number and in configuration of the crystallites formed in drawing, which in turn is a function of the distribution of the components that may act as seeds of crystallization in the polymer before extrusion and drawing. According to the present invention, these seeds of crystallization are formed by the insoluble catalyst system residue.

The composite polyester films of the present invention can be prepared by layering; i.e., extrusion of a polymer on a film that is still molten or already solidified, or by doubling; i.e., by association of two films cast and solidified independently.

Preferably, the process of the present invention comprises co-extruding, using any known apparatus, at least two polyester layers, at least one of these layers comprising a polyester including a catalyst residue which is soluble or only slightly insoluble in the polyester, and drawing this composite polyester film either monoaxially or biaxially. With respect to composite polyester films for use as support for magnetic tapes, for example, the high quality that is required for such magnetic tape support will poorly accommodate itself to tubular extrusion processes, and co-extrusion will have to be done with a flat die, for example, an apparatus such as that described in co-pending patent application Ser. No. 318,778 filed on Dec. 27, 1972, and entitled "Adjustable Flat Spinneret For the Coextrusion of Flat Films Comprising a Plurality of Components and Method For Using Same" now U.S. Pat. No. 3,909,170.

The composite polyester films of the present invention are preferably formed utilizing at least one polyester layer formed by the polycondensation of a dicarboxylic acid and a glycol in the presence of a catalyst or catalyst system which is insoluble in the polyester, or at least substantially insoluble in the melted polyester. Suitable substantially or totally insoluble interchange catalysts and catalyst systems for the melted polyesters include ester interchange systems based on calcium-antimony and lithium-antimony and include compounds such as calcium acetate, calcium benzoate, lithium antimonate, lithium acetate, etc., alone or mixed with potassium antimonate, antimony trioxide, antimony pentoxide, and antimony trichloride.

By utilizing these insoluble catalytic systems in forming the polyesters which are subsequently extruded into at least one layer of the composite films of the present invention, the necessity of adding an additional nucleating agent to the polymer melt is obviated, and by the control of the specific catalytic system utilized, the slip properties and transparency of the resulting film can be controlled.

The composite films of the present invention also include at least one layer formed from a polyester formed by the polycondensation in the presence of a catalyst having a catalytic residue which is soluble or only slightly insoluble; i.e., substantially soluble, in the polyester melt. Examples of catalytic systems which are suitable for use in forming the polyesters which do not contain a signficant amount of nucleating agents are zinc-antimony and manganese-antimony catalytic systems including manganese and zinc acetates, benzoates, carbonates and borates alone or mixed with antimony trioxide, antimony pentoxide or antimony trichloride.

The catalytic systems themselves used to form the composite films of the present invention are conventional and form no part of the present invention except to the degree the catalytic residue is soluble in the polyester melt. This degree of solubility can be determined easily by a person of skill in polyester chemistry.

The composite films of the present invention are preferably formed by co-extruding at least one polyester film containing an insoluble or substantially insoluble catalytic residue and at least one polyester containing a soluble or substantially soluble catalytic residue, and subsequently orienting this composite polyester film either monoaxially or biaxially. Orientation of the polyester film improves the physical properties of these films; however, because this orientation causes crystallization within the polymers around the nucleating agents, the transparency and roughness or slip of the films are altered. For this reason, it is desired to form polyester composite films having good slip properties, while at the same time maintaining adequate transparency. A thin layer of a polyester containing an insoluble catalytic residue may be extruded on each side of a layer of a polyester containing a soluble catalytic residue to produce a composite film as shown in FIG. 1. Subsequent to drawing, the two outer thin layers, although becoming somewhat opaque, will not materially reduce the transmission of light through the film. However, these films will be sufficiently thick so that the slip properties of the composite film will be improved.

It has been generally found that optimum slip and transmission properties are present when the polyester having excellent slip properties comprises from 5 to 25 percent by weight of the composite polyester and the polyester having excellent transmission comprises from 95 to 75 percent by weight of the composite polyester.

As noted above, polyester film having either good slip properties or good transparency have been well known and the compromise between these properties has often led to highly modified polymers. By utilizing the process and laminate of the present invention, however, a composite polyester film having a constant thickness may be produced having completely different surface characteristics and also having the desired amount of transparency or light transmission. Furthermore, it is possible in accordance with the process of the present invention to produce a composite polyester film wherein one side has excellent slip properties, while the other side does not have such slip properties, such as the film shown in FIG. 2. These types of films are often needed in the textile and graphic art industries since the films must be as transparent as possible, but also must be capable of being easily wound and used in a practical manner on processing machines. Accordingly, these films must only have the amount of slip required so that they may be properly processed while at the same time maintaining their excellent transparency and light transmission.

According to the process and composite film of the present invention, a polyester film having the desired properties with regard to light transparency and transmission and the desired slip properties may be produced merely by utilizing a different catalytic system for the co-polycondensation reaction.

The product of the present invention is formed from layers of polyester films which are preferably co-extruded, these polyester films being formed by the polycondensation utilizing different catalytic systems. As noted above, these films are polyesters and include either polyesters or copolyesters formed by the reaction of a dicarboxylic acid, particularly saturated dicarboxylic acids; e.g., terephthalic acid, and a glycol having from 2 to 6 carbon atoms; e.g., ethylene glycol. The preferred polyesters suitable for use as the films of the present invention are the polyethylene terephthalate films, although other polyesters such as the polyethylene adipate, polyethylene dimethyl terephthalate, etc., may be used.

COMPOSITE POLYESTER SUPPORT FOR MAGNETIC RECORDING TAPE

Magnetic tapes for digital recording must recover at least 35 percent of the amplitude of the emitted pulses. Lacunae or drop out may occur if the magnetic coating has insufficient thickness perpendicularly to a signal. Such a lacuna may occur if, at one point, the coating thickness is locally less than about 0.8 microns, or even less with more sensitive coatings than are presently in use. For this type of recording, tape supports whose coefficient of rugosity (i.e., roughness) of the coated face exceeds $0.5\mu$ cannot be used with sufficient reliability.

But even this tolerance is insufficient for magnetic tape supports intended for analog or video recordings which use much higher frequencies. The thickness of the magnetic coating has to be extremely thin, and in some cases cannot exceed 4 microns, because otherwise its reaction rate would be too slow to record such frequencies. It is for this reason that preferably, according to the present invention, composite polyester film supports are used where the coefficient of rugosity of the coated face is no more than 0.4.

The composite polyester film used as a support for magnetic tape according to the present invention is one in which the face to be coated with magnetic particles, such as $CrO_2$ or $Fe_2O_3$, according to any conventional technique comprises a polyester film that is substantially or completely void of insoluble particles which might act as sites for crystallization; i.e., the layer to be coated is a polyester, preferably polyethylene terephthalate obtained from polycondensation reaction of dimethyl terephthalate with ethylene glycol using an interchange catalyst whose residue is soluble in the polyester melt. The undersurface layer of the composite film is prepared from a polyester, again preferably polyethylene terephthalate obtained by polycondensation reaction of dimethyl terephthalate with ethylene glycol, using as the interchange catalyst one whose residue is insoluble or only partially soluble in the polyester melt and which will create sites of crystallization which upon drawing creates sufficient roughness; e.g., microrugosities, which will ensure good slip to the product. The composite polyester film is preferably biaxially drawn for best results. It is also possible to incorporate an additional one or more films of any desired properties (the slip properties and glaze properties being of no substantial importance) between the smooth layer (with magnetic coating) and undersurface layer.

Thus, the composite polyester films of the present invention when used as support for magnetic tape can be prepared by association of any number of layers, provided that the other layers have the appropriate glaze and roughness. However, since the magnetic tape supports are preferably very thin films generally being no thicker than 50 microns, the composite films that are the subject of the instant embodiment of the present invention are preferably films formed of two layers or possibly three, the central layer having qualities of transparency and slip which are in principle of no importance and can be all or in part composed of another polymer.

However, the external faces of the composite polyester film must have the mechanical properties specified for magnetic recording tape supports and must be made of polyester, preferably polyethylene terephthalate.

In determining the roughness; i.e., coefficient of rugosity, of the undersurface layer of the composite polyester film utilized as magnetic tape support, consideration is given not only to ensuring satisfactory slip on the smooth layer as by reduction of coefficient of friction, but also to eliminate occurrence of abrasion. The proper coefficient of rugosity can be easily determined for any given environment. However, it has been found that, in general, increased risk of abrasion results both from too low a coefficient of rugosity (where abrasion results from excess adhesion) and from too high a coefficient of rugosity (where abrasion results from erosion of the nodules). The coefficient of rugosity for the magnetic tape supports of the present invention is from about 0.1 to 0.5 microns, and preferably less than about 0.4 microns.

As will be readily recognized by one of ordinary skill in the art of polyester chemistry, the degree of surface roughness of the undersurface layer and consequently the slip properties of the film can be controlled in several ways. The amounts and type of interchange catalyst and the degree of insolubility of the catalytic residue in the polymer will affect the surface roughness. For example, incorporating phosphorous acid in a catalytic system with calcium acetate base will promote formation of soluble calcium phosphate salt. Also, it is possible to use mixed catalytic systems which will yield both soluble and insoluble residues; e.g., a mixture of calcium and manganese salts. It is also possible to effect suitable mixtures of polymers before extrusion. Also, changes in the temperature and pressure of the polycondensation reaction will modify the rate of precipitation of the catalytic residues. Of course, it is also within the scope of the present invention to incorporate small amounts of insoluble particles in the desired quantity and of suitable geometry in the polyester film. However, the amount used should be sufficiently small as not to impart any interference with the polycondensation reaction.

The coefficient of rugosity as used in the present application is the total rugosity coefficient; i.e., the maximum distance measured in microns between depressions and projections (nodules). This coefficient is measured in the conventional manner, for example, with a Pertometer reference T 25 assembly made by the German company, Perthen, with semi-oscillating sensor with a 3 micron diamond tip, the apparatus having a "high pass" filter whose cutoff wavelength; i.e., the length of a wave beyond which transmission is cut, is 2.5 mm. The measurements were accomplished on starting lengths of 5 mm.

The coefficient of friction as used in the present application is that of the undersurface layer on the smooth face; i.e., that which effectively is concerned in winding and unwinding operations, such coefficient being defined according to ASTM standard D 189463.

This coefficient is adjustable by altering the roughness (rugosity) of the undersurface layer without impinging on that of the smooth face. As noted, the coefficient of friction also applies in the sense of a limitation of the tendency to abrasion. The coefficient of friction for the composite polyester films of the present invention, when used as magnetic tape supports, should be less than 0.7, and preferably less than 0.6. "The coefficient of friction between the respective faces should be at most 0.7 to ensure adequate windability"

The laminate and process of the present invention will be illustrated by the following examples and comparative examples which are for the purposes of illustration only and should not be construed as limiting. All percents are by weight unless otherwise indicated.

EXAMPLES 1 – 3 AND COMPARATIVE EXAMPLES 1 & 2

A polyethylene terephthalate polymer A is prepared by using calcium acetate as the interchange catalyst and a polyethylene terephthalate polymer B is prepared by using manganese acetate as the interchange catalyst.

These polymers are used to prepare films 12 microns thick by extrusion or co-extrusion. These films are then drawn biaxially at a rate of drawing of 2.5:1 in each direction. Comparative Examples 1 & 2 are films of polymer A and polymer B individually. In Examples 1 – 3, polymers A and B are coextruded in variable proportions as shown in Table 1 to obtain composite films with three layers A-B-A. The friction and transparency characteristics of these films measured under identical conditions are indicated in the following table:

TABLE 1

| Example | Polymer A (%) | Polymer B (%) | Friction Factor | Haze |
|---|---|---|---|---|
| Comp. 1 | 100 | 0 | 0.42 | 7.0 |
| 1 | 45 | 55 | 0.44 | 2.4 |
| 2 | 20 | 80 | 0.48 | 1.0 |
| 3 | 10 | 90 | 0.55 | 0.4 |
| Comp. 2 | 0 | 100 | 2.00 | 0.2 |

As is apparent from Table 1, films produced from polymer A or polymer B alone have excellent slip or transmission factors, but not both. The films produced in accordance with the present invention have both acceptable slip and transmission characteristics without adding any separate agents to the composite films.

EXAMPLE 4 AND COMPARATIVE EXAMPLE 3

A polyester blend is prepared comprising 20 percent of polymer A and 80 percent of polymer B of Example 1. This film has a haze of 1.2, a high transparency, but a friction factor of 0.60; i.e., relatively poor slip.

A film (from 25 percent polymer A and 75 percent polymer B) produced using the procedure of Example 1 has a haze of 1.2 and reduces the friction factor from 0.60 to 0.47.

EXAMPLE 5

Figure 2:
FIG. 2 is a cross-sectional view of a second embodiment of the present invention.

A composite film as shown in FIG. 2 is produced by co-extruding 10 percent of a polyethylene terephthalate produced using an ester interchange system of calcium acetate and antimony trioxide and 90 percent of a polyethylene terephthalate produced using a zinc acetate-antimony trioxide catalyst system. This film has good light transmission and has one side with excellent slip characteristics.

EXAMPLE 6

A polyethylene terephthalate polymer A is prepared using as interchange catalytic system 300 parts calcium in the form of acetate per million parts polymer A, and a second polyethylene terephthalate polymer B using as interchange catalytic system 100 parts manganese in the form of acetate per million parts polymer B. These two polymers are co-extruded in two layers of equal thickness so as to form an amorphous film 250 microns in thickness.

After balanced biaxial drawing at the rate of 3.3/1 in two perpendicular directions, a film 23 microns thick is obtained. The undersurface layer; i.e., polymer A, has surface roughness, whereas the other face; i.e., polymer B, is extremely smooth. The coefficient of rugosity of the smooth layer (polymer B), measured with the Pertometer T 25 apparatus, is $0.4\mu$. The coefficient of friction of face B (smooth) on face A (rough) is 0.4, which ensures all the desired winding properties.

Such a film is perfectly suited for production of magnetic tape supports, both for recording of analog signals and for video recording.

EXAMPLE 7

On a cold drum there is extruded as in Example 6 a composite film with two layers of equal thickness, whereof one layer is composed of the same polymer B as in Example 6 and the other layer is composed of a homogeneous mixture of two polyethylene terephthalate polymers, one prepared using as interchange catalytic system 250 parts calcium in the form of acetate per million parts polymer, the other prepared using as interchange catalytic system 200 parts lithium in the form of glycolate per million parts polymer, the two polymers being mixed in a proportion of 20 parts lithium polymer to 80 parts calcium polymer.

After casting and cooling, the composite film is biaxially drawn at a rate of 4 to 1 in the longitudinal direction, and 3.3 to 1 in the transverse direction.

The microrugosity of the smooth face composed of polymer B, measured with the Pertometer, is unchanged; i.e., 0.4 micron. The coefficient of friction of the smooth face against the rough face is 0.30. The longitudinally superdrawn film thus prepared is also an excellent support for magnetic recording tape.

While the process and composite film of the present invention have been described by way of the foregoing specification and examples, the same are for the illustration of the instant process and composite film and should be in no way construed as limiting the scope thereof, the process and composite laminate of the present invention being properly defined by way of the appended claims.

We claim:
1. A magnetic recording tape comprising a film support and a layer of a magnetic material deposited on a surface thereof wherein said film support is a composite polyester laminate consisting essentially of:
   a. a first polyester film layer formed from the polycondensation of dimethyl terephthalate with ethylene glycol in the presence of an ester interchange and polycondensation catalyst system the residue of which is at least substantially insoluble in the polyester melt, and
   b. a second polyester film layer formed from the polycondensation of dimethyl terephthalate with ethylene glycol in the presence of an ester inter- change and polycondensation catalyst system the residue of which is at least substantially soluble in the polyester melt wherein said layer (a) containing the insoluble catalyst residue comprises from 5 to 25 percent by weight of the composite polyester laminate support and layer (b) containing the soluble catalyst residue comprises from 95 to 75 percent by weight of the composite polyester laminate; said second polyester film layer (b) having a coefficient of rugosity of less than $0.5\mu$ and the coefficient of friction between said first layer (a) and said second layer (b) being less than 0.7 and wherein said magnetic material is deposited on the second polyester film layer.

2. The composite polyester laminate support of claim 1, wherein said laminate is produced by coextrusion.

3. The composite polyester laminate support of claim 1, wherein said laminate is produced by layering.

4. The composite polyester laminate support of claim 1, wherein said laminate is produced by doubling.

5. The composite polyester laminate of claim 1, wherein the coefficient of rugosity of said second polyester film is less than about 0.4 microns.

6. The composite polyester laminate of claim 1, wherein said laminate further includes a polymer film layer between said first polyester film layer and said second polyester film layer.

7. The composite polyester laminate of claim 1, wherein the catalyst system the residue of which is at least partially insoluble in the polyester melt is selected from conventional ester interchange and polycondensation catalyst systems consisting essentially of an antimony compound and a salt of calcium or lithium and the catalyst system the residue of which is at least partially soluble in the polyester melt is selected from conventional interchange and polycondensation catalyst systems consisting essentially of an antimony compound and a salt of zinc or manganese.

8. In a process for preparing a magnetic recording tape having a film support having a layer of magnetic material deposited on one surface thereof, the improvement comprising forming the film support from a co-extruded polyester laminate consisting essentially of:

a. a first polyester film layer formed from the polycondensation of dimethyl terephthalate with ethylene glycol in the presence of an ester interchange and polycondensation catalyst system the residue of which is at least substantially insoluble in the polyester melt, and b. a second polyester film layer formed from the polycondensation of dimethyl terephthalate with ethylene glycol in the presence of an ester interchange and polycondensation catalyst system the residue of which is at least substantially soluble in the polyester melt wherein said layer (a) containing the insoluble catalyst residue comprises from 5 to 25 percent by weight of the composite polyester laminate support and layer (b) containing the soluble catalyst residue comprises from 95 to 75 percent by weight of the composite polyester laminate; said second polyester film layer having a coefficient of rugosity of less than $0.5\mu$ and the coefficient of friction between said first layer and said second layer being less than 0.7 and depositing said layer of magnetic material on said second polyester film layer.

9. The process of claim 8, wherein the coefficient of rugosity of said second polyester layer is less than about 0.4 microns.

10. The process of claim 8, wherein the catalyst system the residue of which is at least partially insoluble in the polyester melt is selected from conventional ester interchange and polycondensation catalyst systems consisting essentially of an antimony compound and a salt of calcium or lithium and the catalyst system the residue of which is at least partially soluble in the polyester melt is selected from conventional interchange and polycondensation catalyst systems consisting essentially of an antimony compound and a salt of zinc or manganese.

* * * * *